United States Patent
Oka

(10) Patent No.: US 11,223,425 B2
(45) Date of Patent: Jan. 11, 2022

(54) OPTICAL CIRCUIT DEVICE, AND OPTICAL RECEIVER

(71) Applicant: Fujitsu Optical Components Limited, Kawasaki (JP)

(72) Inventor: Akira Oka, Kawasaki (JP)

(73) Assignee: FUJITSU OPTICAL COMPONENTS LIMITED, Kawasaki (JP)

( * ) Notice: Subject to any disclaimer, the term of this patent is extended or adjusted under 35 U.S.C. 154(b) by 0 days.

(21) Appl. No.: 17/143,720

(22) Filed: Jan. 7, 2021

(65) Prior Publication Data

US 2021/0273730 A1    Sep. 2, 2021

(30) Foreign Application Priority Data

Feb. 28, 2020  (JP) .............................. JP2020-033970

(51) Int. Cl.
*H04B 10/60*    (2013.01)

(52) U.S. Cl.
CPC .................................... *H04B 10/60* (2013.01)

(58) Field of Classification Search
CPC ....................................................... H04B 10/60
See application file for complete search history.

(56) References Cited

U.S. PATENT DOCUMENTS

| | | | | |
|---|---|---|---|---|
| 3,665,333 A | * | 5/1972 | Yastrov .................. | H03F 1/3217 330/53 |
| 4,887,314 A | * | 12/1989 | Carroll ................... | H04B 10/61 398/204 |
| 10,126,498 B1 | * | 11/2018 | Ma ........................... | H01L 33/58 |
| 10,731,383 B2 | * | 8/2020 | Yamazaki ................. | E05C 3/24 |
| 2011/0229069 A1 | * | 9/2011 | Bontempi .............. | G02B 6/122 385/3 |
| 2013/0128907 A1 | * | 5/2013 | Hsieh ................... | H04B 10/613 372/29.023 |

(Continued)

FOREIGN PATENT DOCUMENTS

| | | |
|---|---|---|
| JP | 5690902 | 3/2015 |
| JP | 5728140 | 6/2015 |
| JP | 6047527 | 12/2016 |

OTHER PUBLICATIONS

U.S. Appl. No. 10/126,498, filed Nov. 13, 2018, Ma et al.

(Continued)

*Primary Examiner* — Tanya T Motsinger
(74) *Attorney, Agent, or Firm* — Staas & Halsey LLP

(57) ABSTRACT

An optical circuit device includes a first to fourth optical couplers, wherein the first optical coupler splits a first input light into a first output beam and a second output beam with a 90-degree phase difference therebetween, and the second optical coupler splits a second input light into a third output beam and a fourth output beam with a 180-degree phase difference therebetween. The third optical coupler combines one of the first and second output beams and one of the third and fourth output beams, and outputs a first optical signal and a second optical signal having a 180-degree phase shift from each other. The fourth optical coupler combines the other of the first and second output beams and the other of the third and fourth output beams, and outputs a third optical signal and a fourth optical signal having a 180-degree phase shift from each other.

10 Claims, 14 Drawing Sheets

(56) References Cited

U.S. PATENT DOCUMENTS

| | | | |
|---|---|---|---|
| 2013/0236172 A1* | 9/2013 | Suzuki | H04B 10/614 |
| | | | 398/43 |
| 2014/0086595 A1* | 3/2014 | Yamazaki | G02F 2/002 |
| | | | 398/214 |
| 2015/0104128 A1 | 4/2015 | Oka et al. | |
| 2016/0178841 A1 | 6/2016 | Oka et al. | |
| 2016/0274438 A1* | 9/2016 | Shimizu | G02B 6/12 |
| 2017/0139136 A1 | 5/2017 | Oka | |
| 2019/0049665 A1 | 2/2019 | Ma et al. | |
| 2021/0273730 A1* | 9/2021 | Oka | H04B 10/60 |
| 2021/0294038 A1* | 9/2021 | Oka | G02B 6/29344 |

OTHER PUBLICATIONS

"Implementation Agreement for Micro Intradyne Coherent Receivers", OIF, IA #OIF-DPC-MRX-02.0, Retrieved from <URL: https://www.oiforum.com/wp-content/uploads/2019/01/OIF-DPC-MRX-02.0.pdf>, pp. 1-41 (2017) (41 pages).

Luhua Xu, et al., "Compact high-performance adiabatic 3-dB coupler enabled by subwavelength grating slot in the silicon-on-insulator platform", Optics Express, vol. 26, No. 23, pp. 29873-29885, (2018) (13 pages).

\* cited by examiner

OPTICAL CIRCUIT DEVICE, AND OPTICAL RECEIVER

CROSS-REFERENCE TO RELATED APPLICATIONS

This application is based upon and claims priority to earlier filed Japanese Patent Application No. 2020-033970 filed Feb. 28, 2020, which is incorporated herein by reference in its entirety.

FIELD

The present disclosure relates to an optical circuit device and an optical receiver.

BACKGROUND

In recent years, high-speed, high-capacity coherent optical communication has been introduced to backbone networks. In coherent optical communication, the amount of data transferred per unit time is increased using two orthogonal phase information, in-phase (hereinafter referred to as "I") signal and quadrature (hereinafter referred to as "Q") signal, of the optical electric field.

When signal light containing I signal and Q signal is received at an optical receiver, a reference light for providing a phase reference at the time of signal reception is mixed with the received signal light to detect and separate the I signal and the Q signal. A photonic waveguide device having this coherent detecting function is called a "90-degree optical hybrid".

FIG. 1 is a functional diagram of a 90-degree optical hybrid. The signal light and the reference light input to the 90-degree optical hybrid are each split into two, and a 90-degree phase difference is given between the two split optical components. The components having the same phase as the input lights are I components, and the components having an optical phase shifted by 90 degrees from the input light are Q components. The signal light and the reference light, each split into two and provided with a π/2 phase shift, are mixed, and four optical signals Ip, In, Qp, and Qn whose phases are shifted by 90 degrees respectively are output from the 90-degree optical hybrid.

The notations "p" and "n" represent complementary outputs. The optical signals Ip and In have a 180-degree phase difference, and the optical signals Qp and Qn have a 180-degree phase difference. The output ports for Ip, In, Qp, and Qn are connected to the inputs of a photodetector array, and the four optical components are converted into electrical signals. After the photoelectric conversion, a difference between Ip and In and a difference between Qp and Qn are acquired to determine the I signal and the Q signal.

One conventional technique for implementing a 90-degree optical hybrid by an on-chip photonic waveguide device is to combine a 1×2 coupler with 2×2 couplers. See, for example, U.S. Pat. No. 10,126,498. The number of modes used in the combination of the 1×2 coupler and the 2×2 couplers is less than that in a 4×4 multi-mode interferometer (MMI), and influence of the wavelength dependency of inter-mode interference is reduced.

The coherent receiver developed by the Optical Internetworking Forum (OIF), which is a standardization project for optical transport networks, supports a layout design of four input ports of an electric block where Ip, In, Qp, and Qn are arranged in this order, corresponding to the layout design of four output ports of a 90-degree optical hybrid.

When the known configuration of the combination of a 1×2 coupler and 2×2 couplers is applied to a standardized coherent receiver, the four output ports of the 90-degree optical hybrid do not match the layout design of the input ports of the electrical block. In order to compensate for the mismatch in the port layout, redundant optical wiring is required, and crosstalk and optical loss will occur. To compensate for the inconsistency in the positional relationship between the output ports of the 90-degree optical hybrid and the standardized layout of the optical to electrical (O/E) conversion block, the configuration of the digital signal processor (DSP) provided subsequent to the O/E conversion block could be changed. However, changing the DSP configuration requires extra time and effort.

It is desired to make the positional relationship between ports of an optical circuit device and the subsequent O/E conversion block consistent by a simple structure. Such a structure may effectively reduce optical loss.

SUMMARY

According to one aspect of the disclosure, an optical circuit device has a first optical coupler configured to split a first input light into a first output beam and a second output beam with a 90-degree phase difference therebetween, a second optical coupler configured to split a second input light into a third output beam and a fourth output beam with a 180-degree phase difference therebetween, a third optical coupler configured to combine one of the first and second output beams of the first optical coupler and one of the third and fourth output beams of the second optical coupler, and output a first optical signal and a second optical signal having a 180-degree phase shift from each other, and a fourth optical coupler configured to combine the other of the first and second output beams of the first optical coupler and the other of the third and fourth output beams of the second optical coupler, and output a third optical signal and a fourth optical signal having a 180-degree phase shift from each other.

The object and advantages of the invention will be realized and attained by means of the elements and combinations particularly pointed out in the claims. It is to be understood that both the foregoing general description and the following detailed description are exemplary and explanatory and are not restrictive to the invention as claimed.

DESCRIPTION OF EMBODIMENTS

Prior to explaining particulars of an optical circuit device of an embodiment, a technical concept conceived by the inventor is described in more detail.

Figure 1:
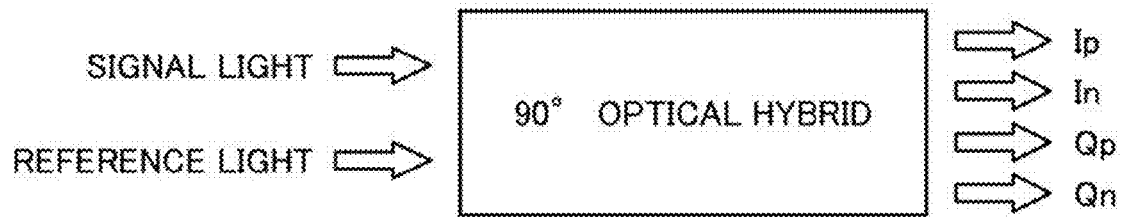
FIG. 1 is a functional diagram of a 90-degree optical hybrid.
Figure 2:
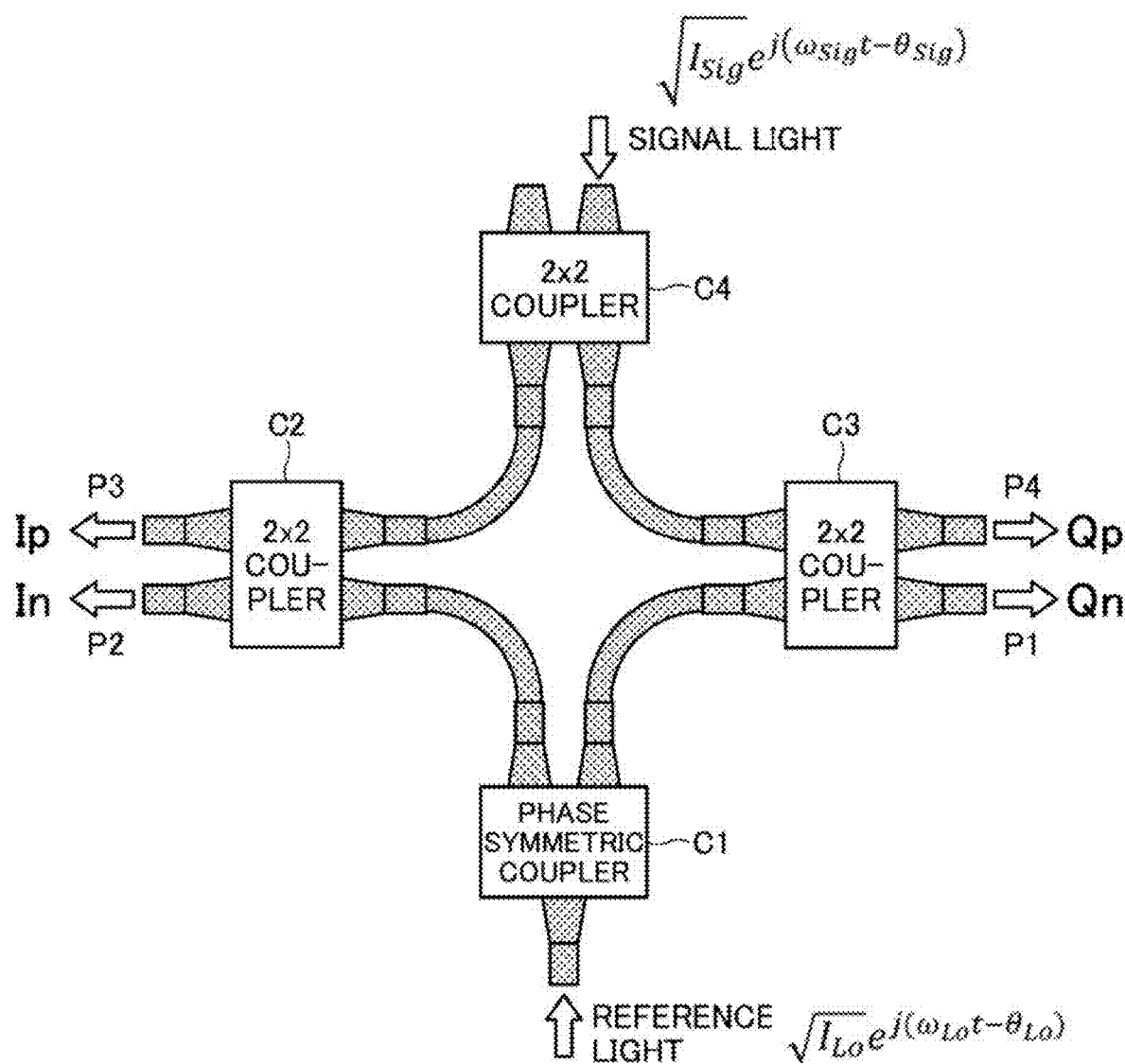
FIG. 2 is a diagram reconfiguring a known structure of an optical circuit of 90-degree optical hybrid.
Figure 3:
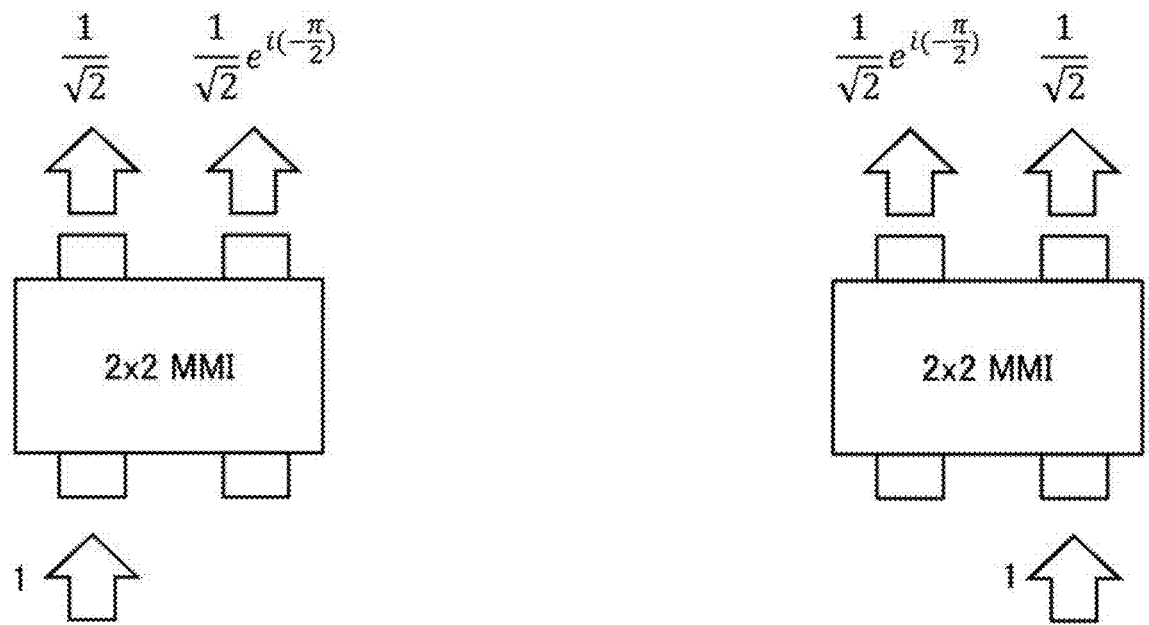
FIG. 3 illustrates electric field transfer functions of 2×2 MMIs and a phase-symmetric optical coupler used in FIG. 2.
Figure 3:
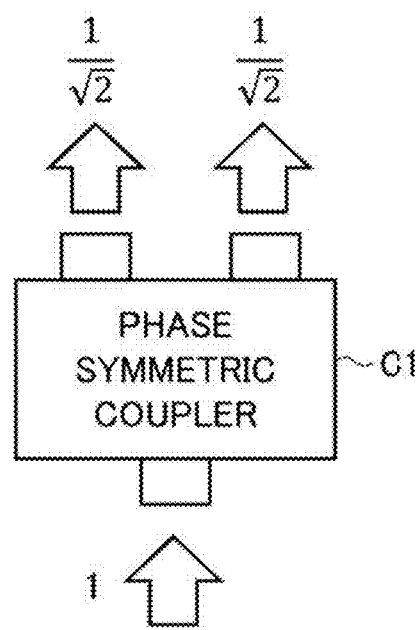
Figure 4:
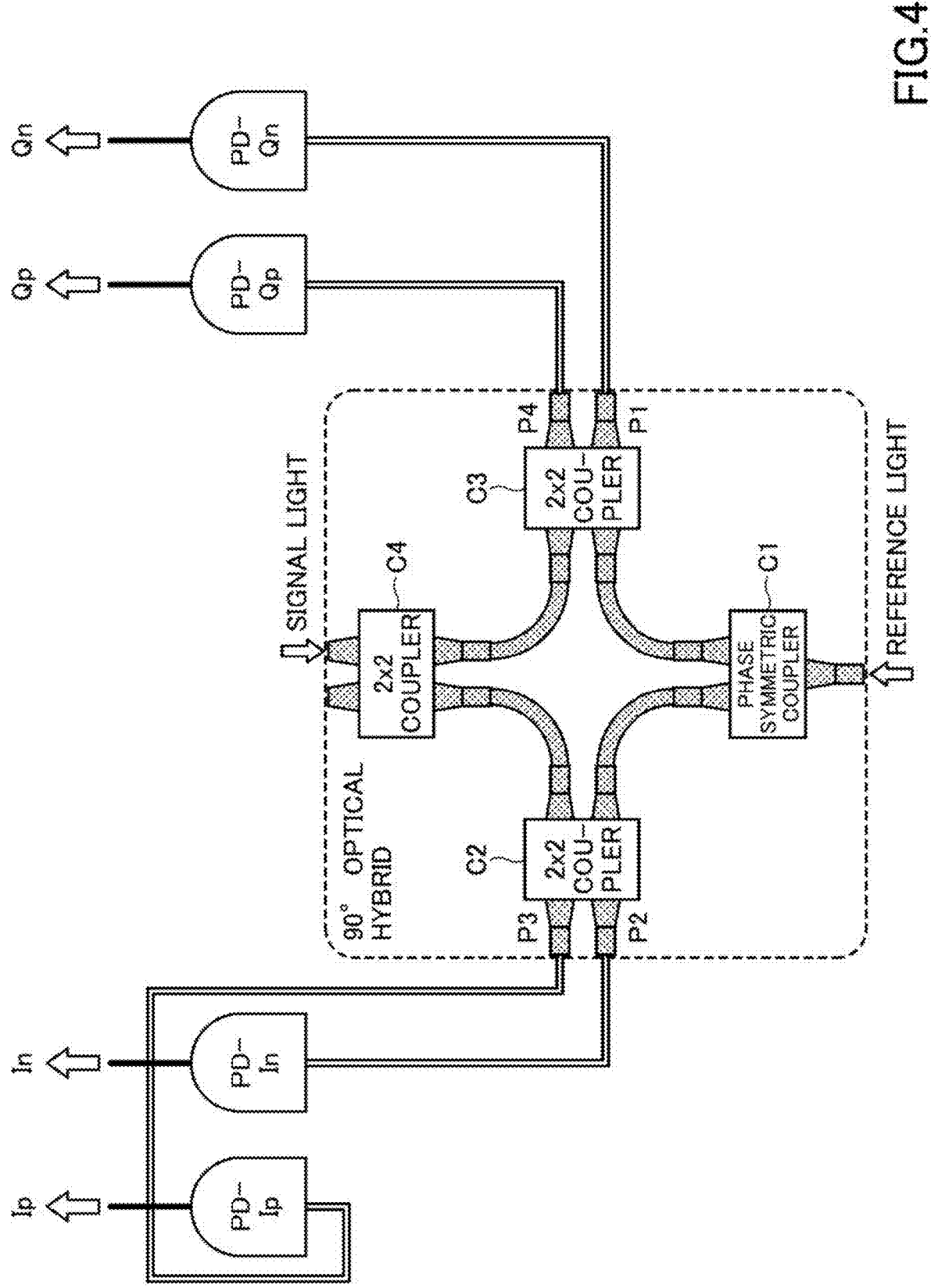
FIG. 4 is a diagram explaining for a technical issue arising in the configuration of FIG. 2.

FIG. 2 to FIG. 4 are diagrams for explaining a technical issue arising in the known structure of 90-degree optical hybrid. FIG. 2 reconfigures the optical circuit proposed in the above-described US patent into a simplified form. In this optical circuit, one 1×2 coupler labeled as "C1" and three 2×2 couplers C2 to C4 are connected by optical waveguides.

The 1×2 coupler is a phase-symmetric coupler C1 formed by a Y-branch optical coupler/splitter. In the above-described US patent, the term "phase-symmetric coupler" or splitter is defined as "an optical coupler that is configured to split input light into two light signals of substantially same optical phase." A reference light is input to the input port of the phase-symmetric coupler C1 and split into two light components. One light component is connected to one input port of the 2×2 coupler C2 and the other is connected to one input port of the 2×2 coupler C3.

A signal light is input to one input port of the 2×2 coupler C4 and split into two signal light beams. One of the signal light beams is connected to the other input port of the 2×2 coupler C2, and the other is connected to the other input port of the 2×2 coupler C3.

The 2×2 coupler C2 causes the incident reference light and the incident signal light to interfere with each other, and outputs In and Ip signals from the output ports P2 and P3, respectively. The 2×2 coupler C3 causes the incident reference light and the incident signal light to interfere with each other, and outputs Qn and Qp signals from the output ports P1 and P4, respectively.

The reference light is expressed as $(\sqrt{I_{LO}}) \times e^{j(\omega_{LO}t - \theta_{LO})}$. The signal light is expressed as $(\sqrt{I_{sig}}) \times e^{j(\omega_{sig}t - \theta_{sig})}$. $I_{LO}$ and $I_{sig}$ denote the intensities of the reference light and the signal light, $\omega_{LO}$ and $\omega_{sig}$ denote the angular frequencies of the reference light and the signal light, and $\theta_{LO}$ and $\theta_{sig}$ denote the optical phases of the reference light and the signal light.

FIG. 3 illustrates transfer functions of the electric field of the 2×2 MMI and the phase-symmetric coupler C1. In the phase-symmetric coupler C1, when a signal normalized to "1" is input, two signals with the same optical phase, each having amplitude $1/\sqrt{2}$, are output from the two output ports.

In the 2×2 MMI, when a signal normalized to "1" is input to one of the input ports, the output of the bar port is $1/\sqrt{2}$, and the output of the cross port becomes $(1/\sqrt{2}) \times e^{j(-\pi/2)}$.

Based upon the functions of the couplers illustrated in FIG. 3, when the reference light is input to the phase-symmetric coupler C1, while the signal light is input to one input port of the 2×2 coupler C4 in FIG. 2, the powers of light beams output from the of port P1, P2, P3, P4 are expressed by Equation (1).

$$P_1 = \frac{1}{4}\left\{I_{Sig} + I_{Lo} - 2\sqrt{I_{Sig}I_{Lo}} \cos\left(\Phi_0 - \frac{\pi}{2}\right)\right\} \quad (1)$$

$$P_2 = \frac{1}{4}\left\{I_{Sig} + I_{Lo} - 2\sqrt{I_{Sig}I_{Lo}} \cos(\Phi_0)\right\}$$

$$P_3 = \frac{1}{4}\left\{I_{Sig} + I_{Lo} + 2\sqrt{I_{Sig}I_{Lo}} \cos(\Phi_0)\right\}$$

$$P_4 = \frac{1}{4}\left\{I_{Sig} + I_{Lo} + 2\sqrt{I_{Sig}I_{Lo}} \cos\left(\Phi_0 - \frac{\pi}{2}\right)\right\}$$

$$\Phi_0 = (\omega_{Sig} - \omega_{Lo})t - (\theta_{Sig} - \theta_{Lo})$$

The outputs from P1 and P4 are complementary to each other, for example, Qn is output from P1, and Qp is output from P4. The outputs from P2 and P3 are complementary to each other, for example, signal In is output from P2, and Ip is output from P3. The ultimate I signal is represented by $(P_3-P_2)$, and the ultimate Q signal is represented by $(P_4-P_1)$.

$$I = P_3 - P_2 = \sqrt{I_{Sig}I_{Lo}} \cos(\Phi_0)$$

$$Q = P_4 - P_1 = \sqrt{I_{Sig}I_{Lo}} \cos\left(\Phi_0 - \frac{\pi}{2}\right)$$

In a coherent receiver, after the optical outputs of Ip, In, Qp, and Qn are converted into electrical signals, the difference between Ip and In and the difference between Qp and Qn are determined. With the inputs to the electrical block, that is, the outputs from photodetectors (PDs) arranged in the order of Ip, In, Qp, and Qn as standardized by the OIF, inconvenience arises in optical wirings.

FIG. 4 illustrates a technical issue arising in the configuration of FIG. 2. The optical signal "In" output from the port P2 of the 2×2 coupler C2 is connected to PD-In configured to generate an electrical signal for In, and optical signal Ip output from the port P3 of the 2×2 coupler C2 is connected to PD-Ip configured to generate an electrical signal for Ip.

In order to supply the optical signal Ip to PD-Ip, the optical wiring has to bypass the PD array, and the length of the optical wiring is increased. This layout would increase the optical loss.

To shorten the optical wiring, a layout design of optical waveguides crossing each other may be employed; however, crosstalk and optical loss will again increase due to the intersection.

Configuration of Embodiment

Figure 5:
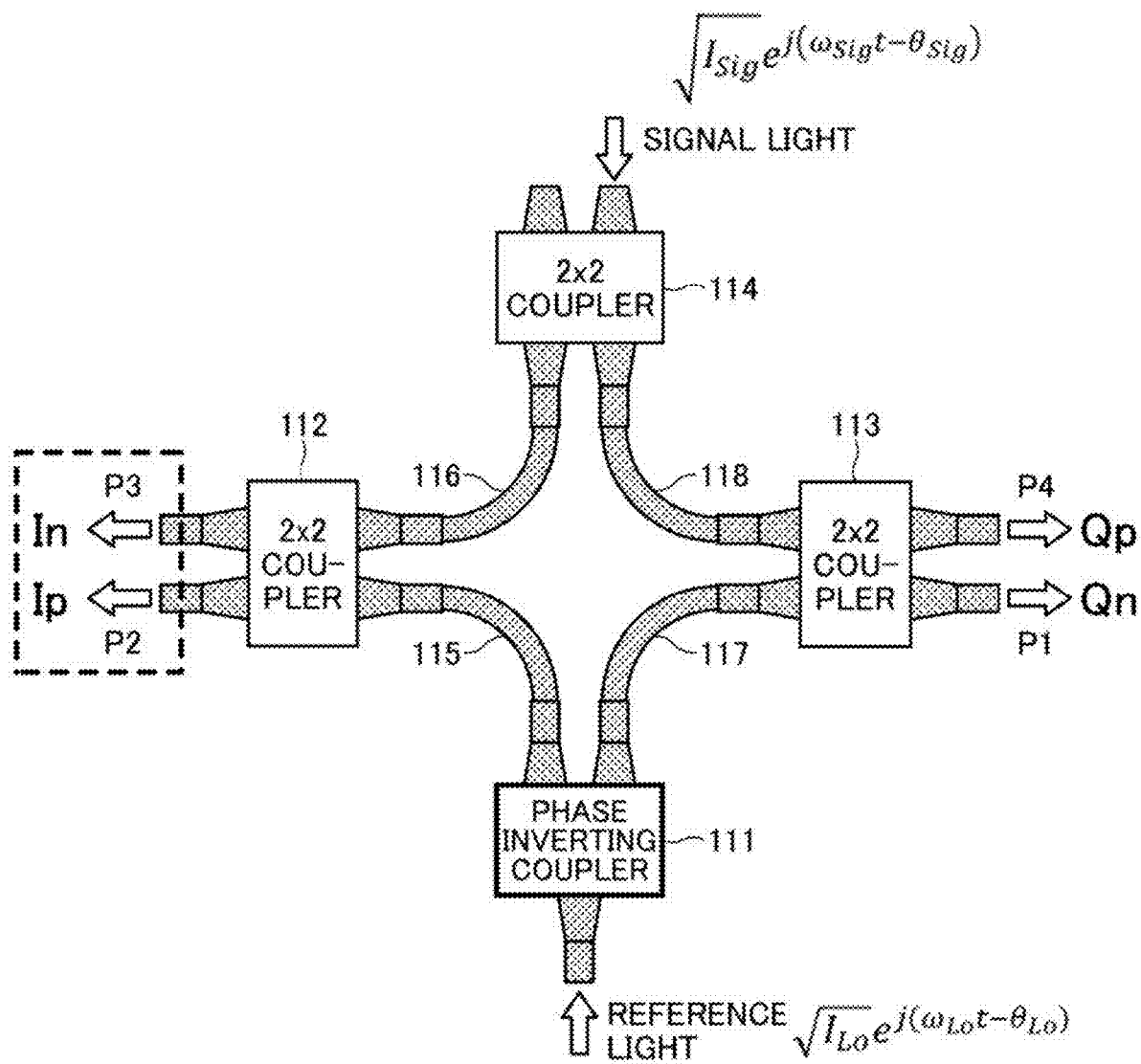
FIG. 5 is a schematic diagram of an optical circuit device according to an embodiment.

FIG. 5 is a schematic diagram of an optical circuit device 11 according to an embodiment. The optical circuit device 11 has a phase inverting coupler 111, and 2×2 couplers 112, 113 and 114, and serves as a 90-degree optical hybrid overall. Unlike the conventional configuration, the optical circuit device 11 uses the phase inverting coupler 111 as an optical splitter that splits the input light into two. Here, the "phase inverting coupler" is an optical coupler that splits an input light into two components at a 50/50 split ratio providing a 180-degree phase difference between them.

Figure 6:
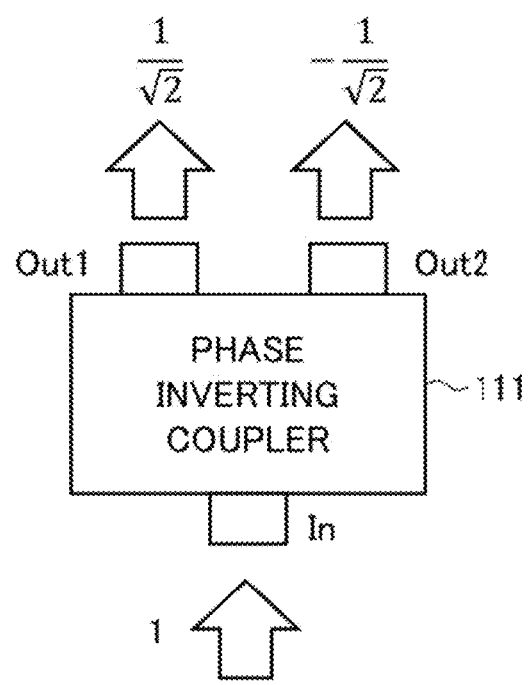
FIG. 6 is a functional block diagram of an phase inverting coupler used in the optical circuit device of FIG. 5.

FIG. 6 illustrates a function of the phase inverting coupler 111. When a light normalized to "1" is input to the phase inverting coupler 111, the input light is split into two with amplitudes of $1/\sqrt{2}$ and $-1/\sqrt{2}$. The $1/\sqrt{2}$ light is output from one of the two output ports, and $-1/\sqrt{2}$ light is output from the other output port.

The phase difference between the two output light beams of the phase inverting coupler 111 may not be exactly 180 degrees (i.e., π radians) and it may include an error of an acceptable range. Because the OIF standardization specification allows an error of 90 degrees±7.5 degrees for the phase difference between I and Q signals, the phase difference between the two outputs of the phase inverting coupler 111 may also include an error of 180±7.5 degrees.

The functions of the 2×2 couplers 112 to 114 are the same as those illustrated in FIG. 3. The phase difference between the output light beams appearing at the bar port and the cross por of the 2×2 couplers 112 to 114 may also include a certain degree of error.

Returning to FIG. 5, a reference light is input to the phase inverting coupler 111, and two light beams with a 180-degree phase shift are output. One feature of the phase inverting coupler 111 is to provide a 180-degree phase difference between the two split light beams.

One of the two outputs of the phase inverting coupler 111 is connected to one of the inputs to the 2×2 coupler 112 by an optical waveguide 115. The other output of the phase inverting coupler 111 is connected to one of the inputs to the 2×2 coupler 113 by an optical waveguide 117.

On the other hand, a signal light is input to one of the input ports of the 2×2 coupler 114, and is split into two. The 2×2 coupler 114 is an optical splitter with two outputs, between which a 90-degree phase difference is provided as illustrated by the transfer function of FIG. 3.

One of the two outputs of the 2×2 coupler 114 is connected to the other input to the 2×2 coupler 112 by an optical waveguide 116. The other output of the 2×2 coupler 114 is connected to the other input to the 2×2 coupler 113 by an optical waveguide 118.

The 2×2 coupler 112 is an optical combiner having two input ports and two output ports, and is configured to combine one of the outputs from the 2×2 coupler 114 and one of the outputs from the phase inverting coupler 111.

The 2×2 coupler 113 is an optical combiner having two input ports and two output ports, and is configured to combine the other output from the 2×2 coupler 114 and the other output from the phase inverting coupler 111.

Because the optical waveguides 115 to 117 connect the phase inverting coupler 111 with the adjacent 2×2 couplers 112, 113 and 114 do not intersect with each other, excessive loss due to crossing waveguide can be prevented. The optical waveguide 115 and the optical waveguide 116 may be of the same length. The optical waveguide 117 and the optical waveguide 118 may be of the same length.

The reference light input to the phase inverting coupler 111 is expressed as $\sqrt{I_{LO}} \times \hat{j}(\omega_{LO} t - \theta_{LO})$, and the signal light input to the 2×2 coupler 114 is expressed as $\sqrt{I_{sig}} \times e\hat{j}(\omega_{sig} t - \theta_{sig})$. With the phase inverting coupler 111, the optical powers at the output ports 81 to 84 are determined based upon the electric field transfer function of FIG. 6 and upon the electric field transfer functions of the 2×2 MMI coupler of FIG. 2. The output powers are expressed by Equation (2).

$$P_1 = \frac{1}{4}\{I_{Sig} + I_{Lo} - 2\sqrt{I_{Sig}I_{Lo}}\cos(\Phi_0 - \frac{\pi}{2})\} \quad (2)$$

$$P_2 = \frac{1}{4}\{I_{Sig} + I_{Lo} + 2\sqrt{I_{Sig}I_{Lo}}\cos(\Phi_0)\}$$

$$P_3 = \frac{1}{4}\{I_{Sig} + I_{Lo} - 2\sqrt{I_{Sig}I_{Lo}}\cos(\Phi_0)\}$$

$$P_4 = \frac{1}{4}\{I_{Sig} + I_{Lo} + 2\sqrt{I_{Sig}I_{Lo}}\cos(\Phi_0 - \frac{\pi}{2})\}$$

$$\Phi_0 = (\omega_{Sig} - \omega_{Lo})t - (\theta_{Sig} - \theta_{Lo})$$

Comparing the output powers $P_2$ and $P_3$ of Equation (2) with those in Equation (1), the cosine terms are opposite in positive/negative sign to each other. The output of P2 with a plus sign represents Ip, and the output of P3 with a minus sign represents In. The final I signal is determined by (P2−P3).

The output relationship between P1 and P4 is the same as that depicted in FIG. 2, where Qn is output from P1 and Qp is output from P4. The final Q signal is determined by (P4−P1).

$$I = P_2 - P_3 = \sqrt{I_{Sig}I_{Lo}}\cos(\Phi_0)$$

$$Q = P_4 - P_1 = \sqrt{I_{Sig}I_{Lo}}\cos(\Phi_0 - \frac{\pi}{2})$$

Figure 7:
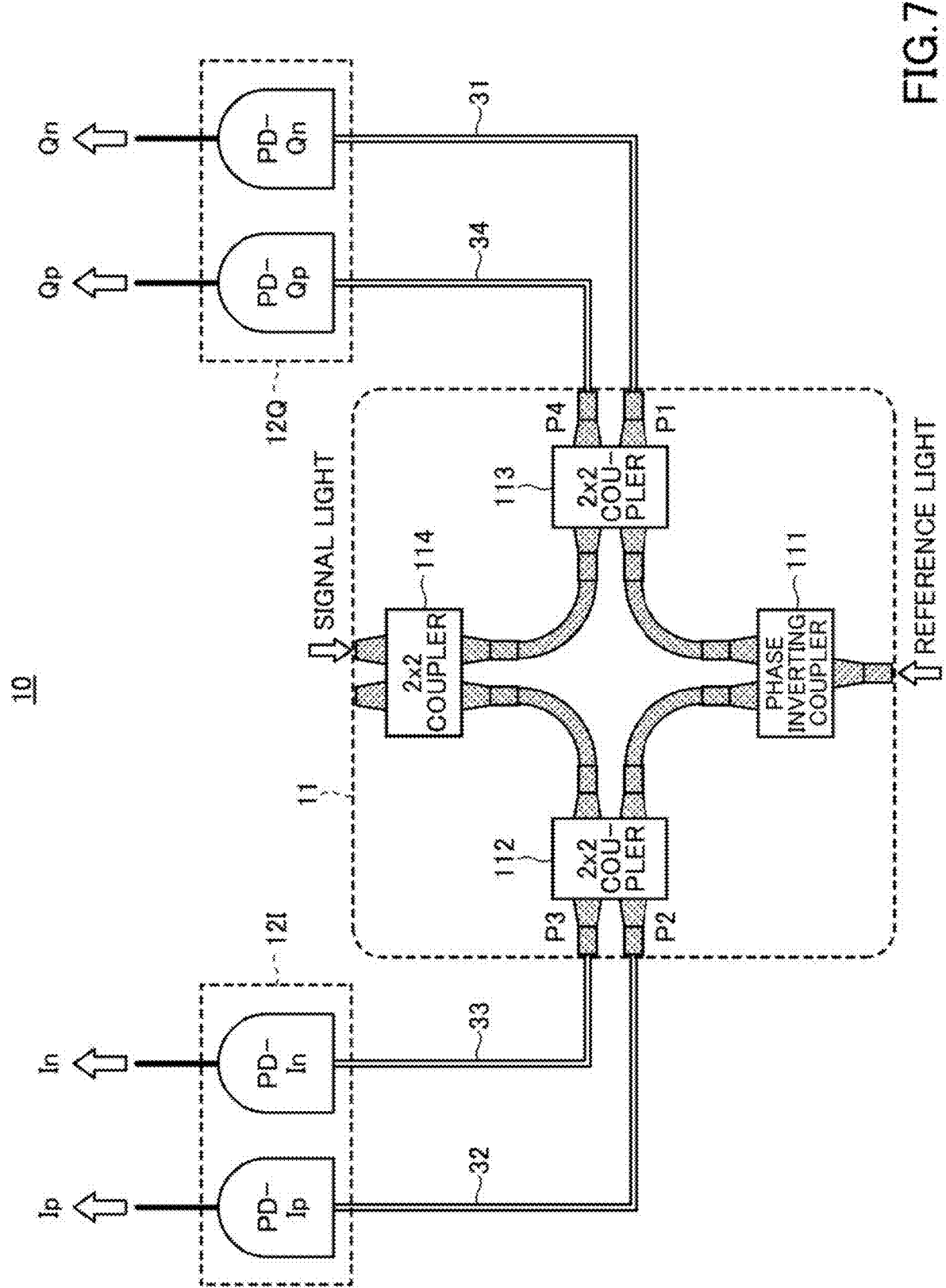
FIG. 7 illustrates optical wirings when the optical circuit device of the embodiment is used.

FIG. 7 illustrates optical wirings of the optical circuit device 11. In a standardized coherent receiver, the photodetectors that produce inputs to the electrical block are arranged in the order of PD-Ip, PD-In, PD-Qp, and PD-Qn.

The port P2 configured to output the Ip signal is connected by optical wiring 32 to the PD-Ip that produces an electrical signal for Ip. The port P3 configured to output "In" signal is connected by optical wiring 33 to the PD-In that produces an electrical signal for In.

The port P4 configured to output a Qp signal is connected by optical wiring 34 to the PD-Qp that produces an electrical signal for Qp. The port P1 configured to output a Qn signal is connected by optical wiring 31 to the PD-Qn that produces an electrical signal for Qn.

With this layout, the optical wirings 31 to 34 can connect the output ports P1 through P4 of the optical circuit device 11 to the corresponding photodetectors PD at the shortest distance, without bypassing or intersecting. The layout design of the optical wirings is simplified, and crosstalk and optical loss are suppressed. In addition, the size of an optical receiver frontend circuit including the O/E conversion block can be reduced.

Figure 8:
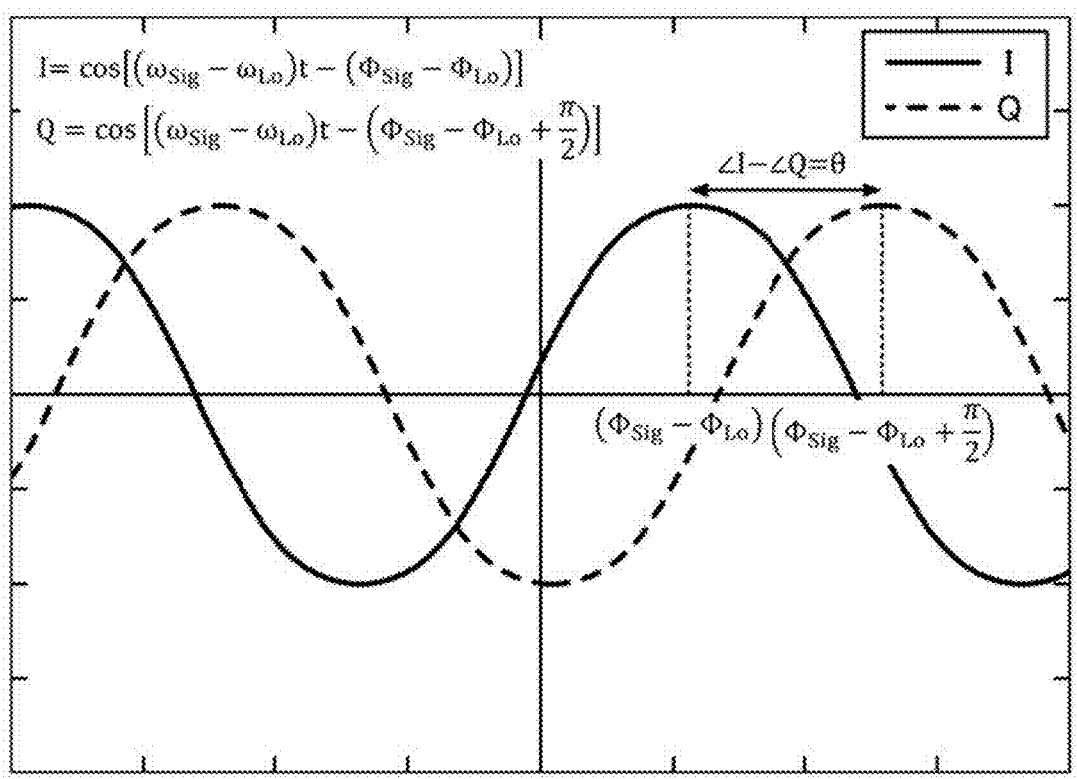
FIG. 8 illustrates a phase difference between an I signal and a Q signal.

FIG. 8 is a diagram illustrating a phase difference between I and Q signals. The I signal is determined by the difference between the Ip and In signals after the O/E conversion, and is expressed as $$I = P2 - P3 = (I_{sig} * I_{LO})^{1/2} \times \cos(\varphi_0)$$

from Equation (2).

The Q signal is determined by the difference between Qp signal and Qn signal after the O/E conversion, and is expressed as $$Q = P4 - P1 = (I_{sig} * I_{LO})^{1/2} \times \cos(\varphi_0 - \pi/2)$$

from Equation (2).

As defined in Equation (2), $\varphi_0$ is written as $\varphi_0=(\omega_{sig}-\omega_{LO})t-(\theta_{sig}-\theta_{LO})$. Here, $\omega_{sig}$ and $\omega_{LO}$ are the angular frequencies of the signal light and the reference light, and $\theta_{sig}$ and $\theta_{LO}$ are the optical phases of the signal light and the reference light, respectively. By substituting $\varphi_0=(\omega_{sig}-\omega_{LO})t-(\theta_{sig}-\theta_{LO})$ in for $\varphi_0$ of the I signal and the Q signal, the I signal and the Q signal, whose phases are shifted by 90 degrees from each other, are obtained, as illustrated in FIG. 8.

Using the optical circuit device 11, optical loss can be suppressed with a simplified wiring layout, and I signal and Q signal can be extracted from a received light signal. The phase inverting coupler 111 used in the optical circuit device 11 may have any configuration as long as the incident light is split into two at a 50/50 split ratio and as long as two light components with a phase difference of about 180 degrees are output. In the following, some examples of the phase inverting coupler 111 will be presented.

<Examples of Phase Inverting Coupler>

Figure 9A:
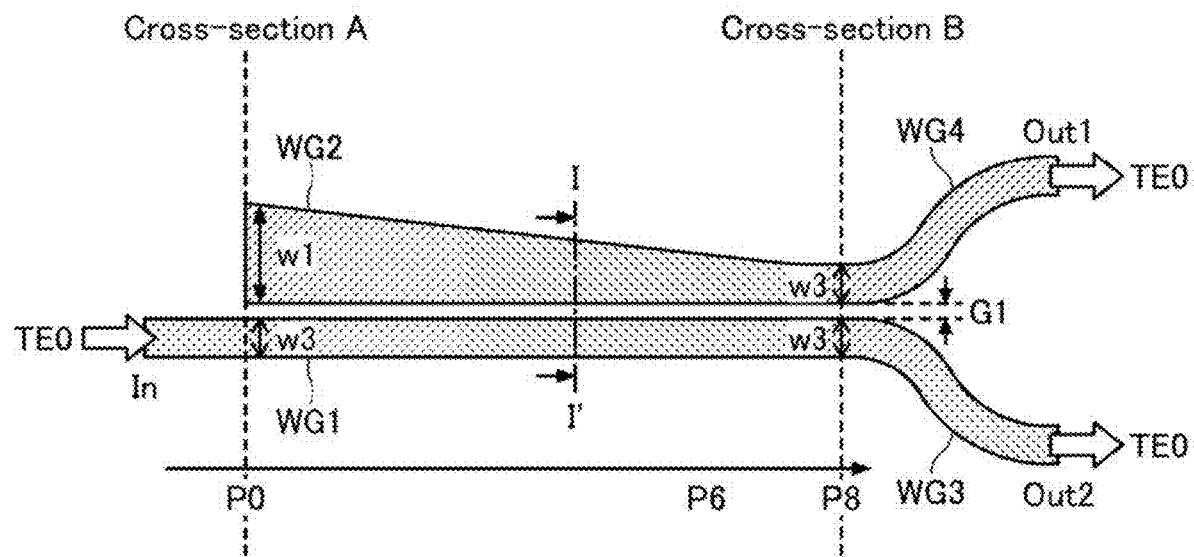
FIG. 9A illustrates a configuration example of a phase inverting coupler.
Figure 9B:
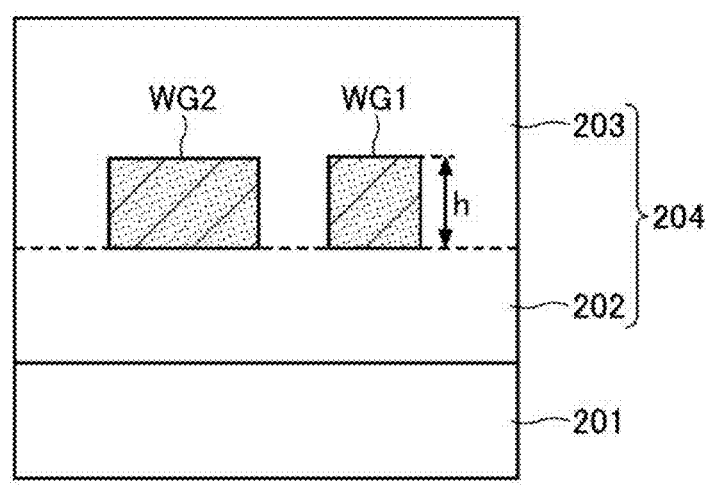
FIG. 9B is a cross-sectional view taken along the I-I' line of FIG. 9A.

FIG. 9A and FIG. 9B illustrate a phase inverting coupler 111A, which is an example of the phase inversion coupler 111. FIG. 9A is a plan view, and FIG. 9B is a cross-sectional view taken along the I-I' line of FIG. 9A. The phase inverting coupler 111A is formed as a directional coupler.

The phase inverting coupler 111A has a first waveguide segment WG1 and a second waveguide segment WG2 provided parallel with the first waveguide segment WG1. The first waveguide segment WG1 and the second waveguide segment WG2 are positioned close to each other with a gap G1 between them. The waveguide width of the first waveguide segment WG1 is constant, while the second waveguide segment WG2 is tapered such that the width continuously varies along the optical axis.

The position of the cross-section A of the directional coupler is labeled as P0, and the position of the cross-section B is labeled as P8. The distance from the cross-section A to the cross-section B is a taper length. At cross-section A, the width of the second waveguide segment WG2 is w1, and the width of the first waveguide segment WG1 is w3 (w1>w3). The second waveguide segment WG2 gradually narrows such that the width becomes w3 at the cross-section B. The first waveguide segment WG1 has a constant width w3 from the cross-section A to the cross-section B. At the cross-section B, the widths of the first waveguide segment WG1 and the second waveguide segment WG2 become the same.

As illustrated in FIG. 9B, the first waveguide segment WG1 and the second waveguide segment WG2 are formed as waveguide cores made of a high refractive index material on a substrate 201. The waveguide cores are surrounded by a cladding 204 of a low refractive index material. The cladding 204 may include an upper+203 and a lower cladding 202 made of the same material, or alternatively, the upper cladding 203 may be an air layer.

When the first waveguide segment WG1 and the second waveguide segment WG2 have the same height h, the cross-sectional areas of the first waveguide segment WG1 and the second waveguide segment WG2 are equal at the cross-section B. At the cross-section B, the first waveguide segment WG1 is connected to the third waveguide segment WG3, while the second waveguide segment WG2 is connected to the fourth waveguide segment WG4. The waveguide segments WG3 and WG4 separate from each other in different directions.

When light is incident on the first waveguide segment WG1, a part of the incident light leaks into the clad and gradually couples to the second waveguide segment WG2 by the evanescent effect during the propagation from the cross-section A to the cross-section B. At the cross-section B, the cross-sectional areas of the first waveguide segment WG1 and the second waveguide segment WG2 become equal to each other, and the light is split into two at a 50/50 split ratio.

Considering optical coupling between waveguides based upon the evanescent effect, odd-mode light has an antisymmetric field distribution in the width direction (or lateral direction) of the waveguide. At the cross-section B, the phase of the electric field distribution is shifted by $\pi$ radians between the first waveguide segment WG1 and the second waveguide segment WG2.

Figure 10A:
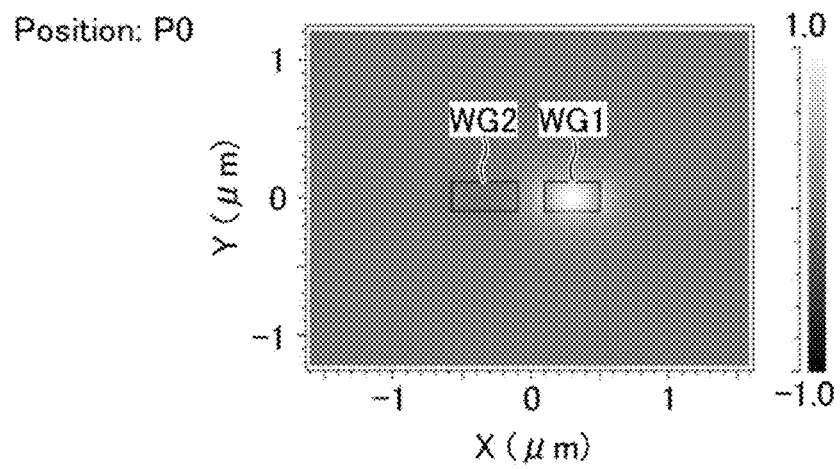
FIG. 10A is an electric field simulation diagram presenting propagation states of the phase inverting coupler at position P0.
Figure 10B:
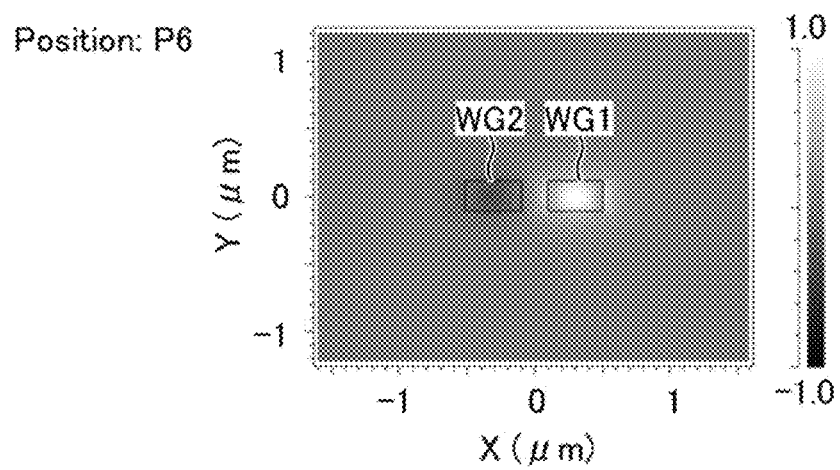
FIG. 10B is an electric field simulation diagram presenting propagation states of the phase inverting coupler at position P6.
Figure 10C:
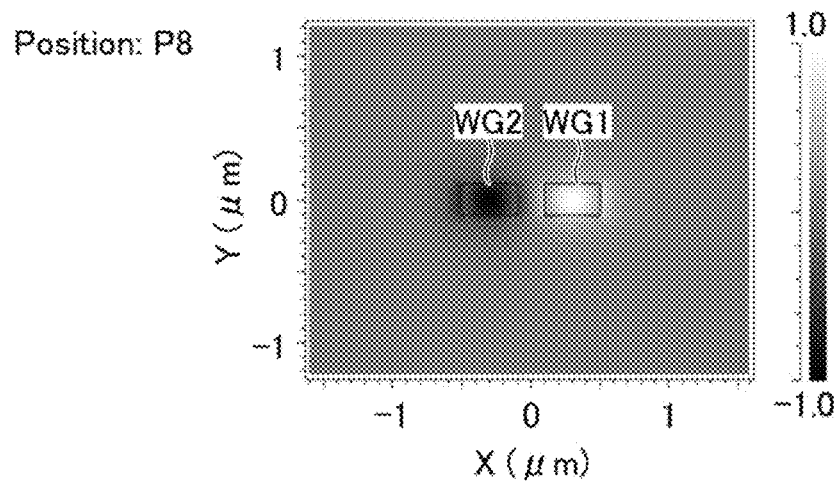
FIG. 10C is an electric field simulation diagram presenting propagation states of the phase inverting coupler at position P8.

FIG. 10A to FIG. 10C are simulation results of the electric field distribution of the phase inverting coupler 111A. Simulation parameters are set as follows. The first waveguide segment WG1 and the second waveguide segment WG1 are formed of a silicon (Si) core with a height of 220 nm, and the Si core is surrounded by SiO2 clad. The width w1 of the second waveguide segment WG2 at the cross-section A is 480 nm, and the width w3 of the second waveguide segment WG2 at the cross-section B is 400 nm. The widths w3 of the first waveguide segment WG1, the third waveguide segment WG3, and the fourth waveguide segment WG4 are all 400 nm. The gap G1 between the first waveguide segment WG1 and the second waveguide segment WG2 is 200 nm, and the taper length along the optical axis is 100 µm.

At position P0 (i.e., at the cross-section A) in FIG. 10A, light of TE odd mode is input to the first waveguide segment WG1. The TE odd mode is a propagating mode with the second highest equivalent refractive index among the transverse electric modes in which the main component of the electric field oscillates horizontally with respect to the substrate 201 and in the width direction of the waveguide. Among the TE modes, the mode with the highest equivalent refractive index is the TE even mode.

Because the equivalent refractive index of the TE odd mode is lower than that of the TE even mode, the electric field distribution is localized in the first waveguide segment WG1 having a smaller waveguide size at the cross-section A (namely, at position P0). This localized light is equivalent to TE0 in the case where the waveguide is isolated. By inputting the TE0 light into the first waveguide segment WG1 with a smaller waveguide size, the TE0 light can be converted to the TE odd mode in the tapered directional coupler.

At position P6 in FIG. 10B, the width of the waveguide of the second waveguide segment WG2 gradually approaches the width w3 of the first waveguide segment WG1, and the TE odd mode leaks from the first waveguide segment WG1. This evanescent light couples to the second waveguide segment WG2. Since the width of the second waveguide segment WG2 varies continuously and slowly, the electric field distribution changes adiabatically while maintaining the continuity.

An "adiabatic" change in the electric field distribution is a state transition of the propagating mode of incident light to another state, while keeping the same propagating mode, without increasing or decreasing the energy, which occurs when the waveguide configuration changes very slowly.

At position P8 (i.e., at the cross-section B) in FIG. 10C, the cross-sectional sizes of the first waveguide segment WG1 and the second waveguide segment WG2 become the same. The electric field of the TE odd mode exists evenly in the first waveguide segment WG1 and the second waveguide segment WG2, and due to the antisymmetric electric field distribution in the TE odd mode, the optical phases between the two waveguides are shifted from each other by 180 degrees. The electric field distribution of the second waveguide segment WG2 is observed as a dark spot because the intensity is represented by a negative sign due to the phase inversion.

Returning to FIG. 9A, at the cross-section B, the third waveguide segment WG3, which extends continuously from the first waveguide segment WG1, and the fourth waveguide segment WG4, which extends continuously from the second waveguide segment WG2, are gradually separated from each other. Thus, a phase inverting coupler having two optical outputs whose phases are shifted by n radian from each other is implemented.

Although in the example of FIG. 9A to FIG. 10C, TE mode light is input to the phase inverting coupler 111A, TM mode light in which the major component of the electric field oscillates normal to substrate 201 may also be input to the phase inverting coupler 111A.

Figure 11:
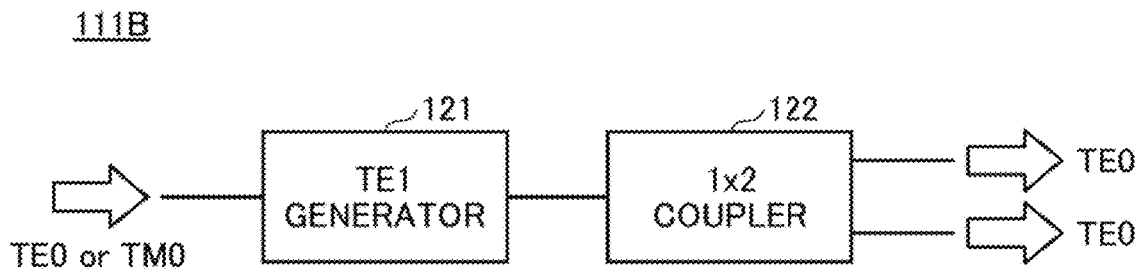
FIG. 11 illustrates another configuration example of the phase inverting coupler.

FIG. 11 illustrates a phase inverting coupler 111B which is another example of the phase inverting coupler 111. The phase inverting coupler 111B is a combination of a 1×2 coupler 122 and a TE1 generator 121. The 1×2 coupler 122 may be a 1×2 MMI, a Y-branch coupler, or the like.

In general, when TE1 is incident on a 1×2 MMI or a Y-branch coupler, two TE0 modes whose phases are shifted by n radians from each other are output. Making use of this phenomenon, the TE1 generator 121 is provided on the input side of the 1×2 coupler 122 to supply TE1 light to the 1×2 coupler. With this structure, incident light of TE0 or TM0 can be converted into two phase-inverted TE0 outputs.

Figure 12:
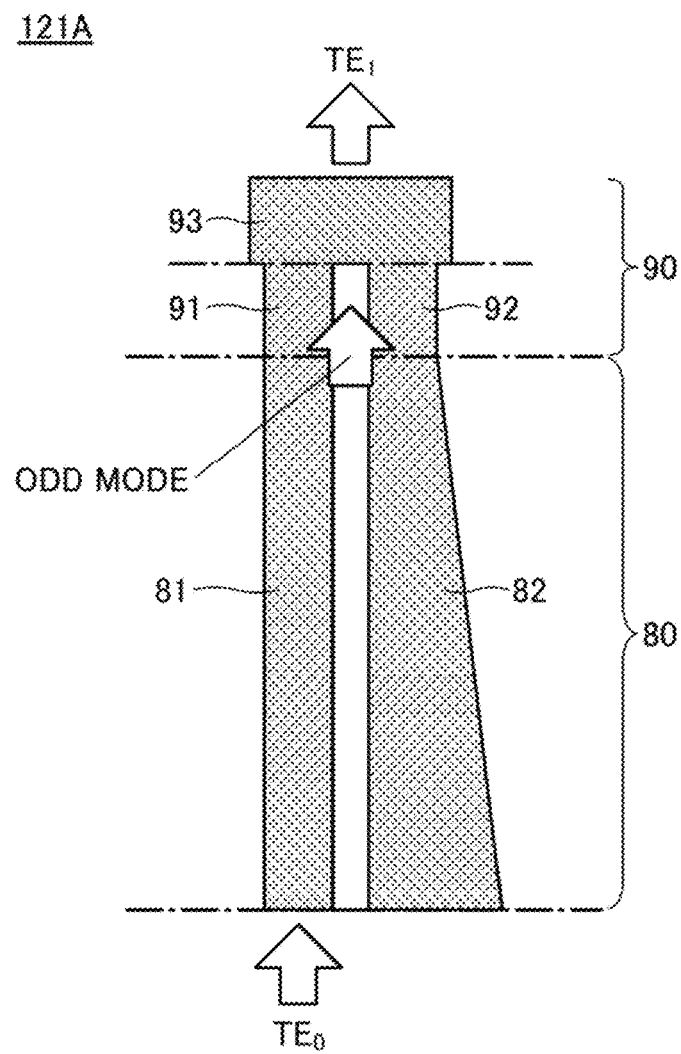
FIG. 12 illustrates a configuration example of a TE1 generator used in the phase inverting couple of FIG. 11.

FIG. 12 illustrates a TE1 generator 121A, which is a configuration example of the TE1 generator 121 used in FIG. 11. The TE1 generator 121A converts TE0 mode light into TE1 mode light.

The TE1 generator 121A has a first mode converter 80 and a second mode converter 90. The first mode converter 80 has a constant-width waveguide 81 and a tapered waveguide 82. The constant-width waveguide 81 and the tapered waveguide 82 are provided adjacent to each other at a predetermined gap between them.

The second mode converter 90 has a constant-width waveguide 91 extending continuously from the constant-width waveguide 81, a constant-width waveguide 92 extending continuously from the tapered waveguide 82, and a coupling waveguide 93 connecting the constant-width waveguides 91 and 92. The width of the coupling waveguide 93 is preferably set wider than the total of the width of the constant-width waveguide 91, the width of the constant-width waveguide 92, and the gap between the two constant-width waveguides 91 and 92.

In the first mode converter 80, TE0 light is incident on the constant-width waveguide 81. At this input end, the width of the tapered waveguide 82 is greater than the width of the constant-width waveguide 81, and mode coupling rarely occurs between the two waveguides. In the TE0 mode, the TE odd mode, which has an equivalent refractive index smaller than that of the TE even mode, is localized in the constant-width waveguide 81 with a smaller cross-section.

While the width of the tapered waveguide 82 gradually decreases and approaches the width of the constant-width waveguide 81, and the TE odd mode is gradually coupled to the tapered waveguide 82. By setting the length of the tapered waveguide 82 sufficiently long, the TE0 light incident on the constant-width waveguide 81 can be converted into the TE odd mode almost without losing power or energy of the light wave.

In the second mode converter 90, the electric field distribution of the TE odd mode existing in the constant-width waveguides 91 and 92 changes to the electric field distribution of the TE1 mode through the coupling waveguide 93. With the TE odd mode, the electric field distribution in the width direction of the waveguide is represented by an antisymmetric function and has two peaks. Among the TE1 modes, the TE1 mode having the second highest equivalent refractive index also has an antisymmetric electric field distribution with two peaks in the width direction. Because of the similarity of the electric field distribution between the TE odd mode and the TE1 mode, the light entering from the constant-width waveguides 91 and 92 and travelling through the coupling waveguide 93 is converted to the TE1 mode light. This TE1 mode light is output from the coupling waveguide 93.

Figure 13:
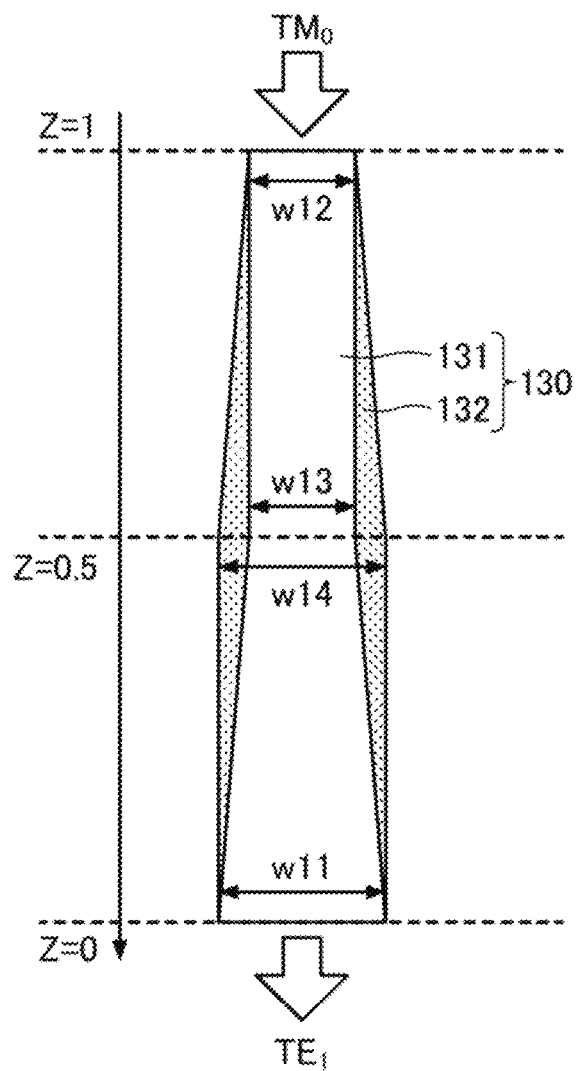
FIG. 13 illustrates another example of the TE1 generator.

FIG. 13 illustrates a TE1 generator 121B which is another configuration example of the TE1 generator. The TE1 generator 121B converts incident TM0 light into TE1 light, and output the TE1 light.

TE1 generator 121B is formed by a waveguide 130 having a top core 131 and a bottom core 132.

At position Z=0 along the optical axis, the widths of the top core 131 and the bottom core 132 are equal, represented as w11. At position Z=0.5 middle along the optical axis, the width w14 of the bottom core 132 is equal to the width w11 of the position Z=0 (w14=w11), while the width of the top core 131 is reduced to w13 (w13<w11).

From position Z=0.5 to Z=1, the width of the top core 131 is constant (w13=w12). On the other hand, the width of the bottom core 132 gradually decreases from w14 to w12. At position Z=1, the top core 131 and the bottom core 132 have the same width w12.

At any point along the optical axis in the entire section from Z=0 to Z=1, the width of the top core 131 is different from the width of the bottom core 132, and the waveguide 130 has an asymmetric shape with respect to the middle plane in the height direction.

Figure 14:
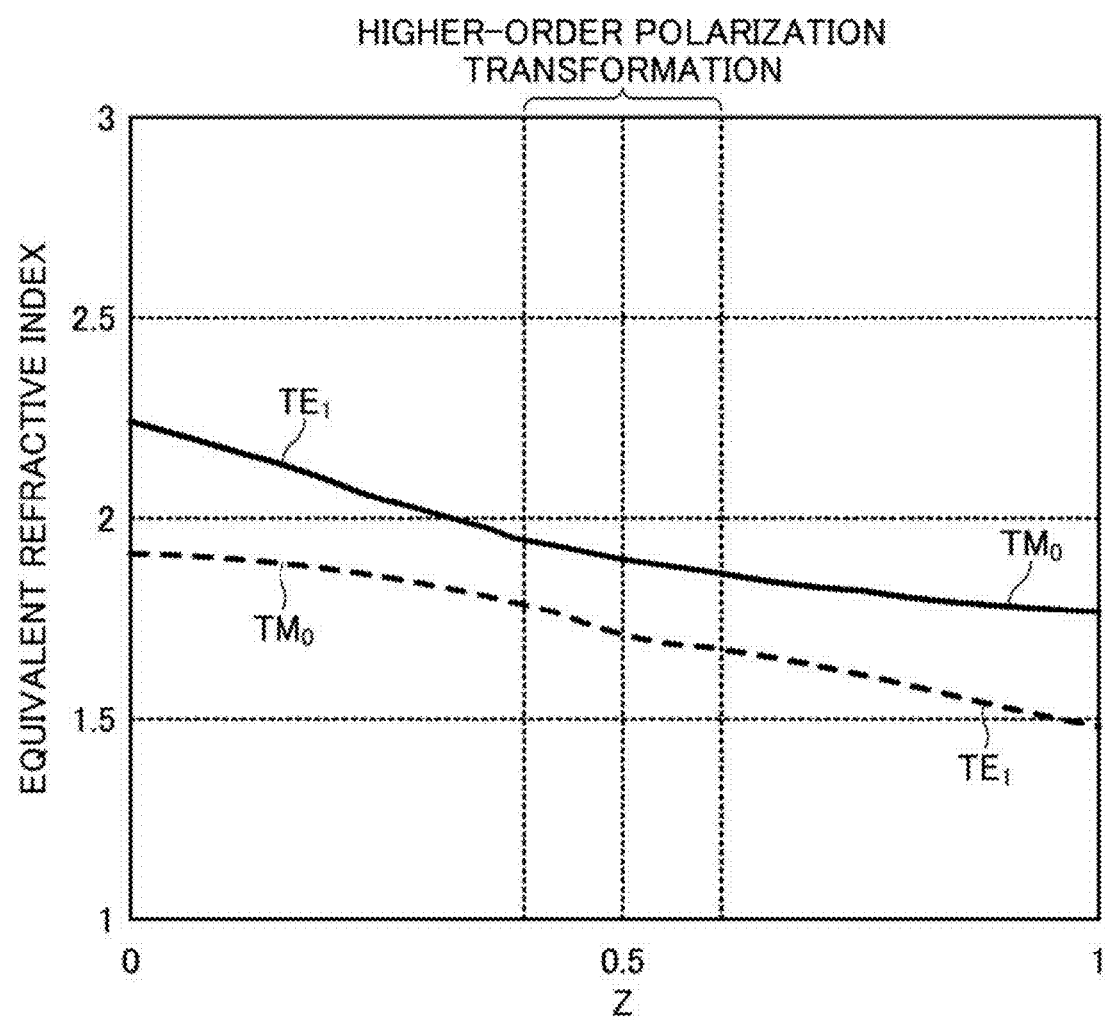
FIG. 14 is a diagram explaining for mode conversion in the TE1 generator of FIG. 13.

FIG. 14 is a diagram explaining mode conversion in the TE1 generator 121B of FIG. 13. The equivalent refractive indexes of TM0 mode and TE1 mode are illustrated as a function of position Z along the optical axis of the TE1 generator 121B. The solid line indicates the second highest equivalent refractive index in the propagating modes of the system of FIG. 13, and the dashed line indicates the third highest equivalent refractive index. The TE0 mode, which has the highest equivalent refractive index, is not illustrated in the figure.

When TM0 mode light is incident on the waveguide 130 at Z=1, the light travels through the waveguide 130 which has the differently shaped top core 131 and bottom core 132. At Z=1, the equivalent refractive index for TM0 mode is higher than the equivalent refractive index for TE1 mode. At Z=0, the equivalent refractive index for TE1 mode is higher than the equivalent refractive index for TM0 mode. In the TM0 mode, the major component of the magnetic field oscillates horizontal to the substrate within the plane perpendicular to the light propagation direction, and change in the equivalent refractive index is small regardless of the Z position.

On the other hand, in the TE1 mode, the major component of the electric field oscillates horizontal to the substrate within the plane perpendicular to the light propagation direction. The equivalent refractive index of the TE1 mode changes greatly from Z=1 to Z=0.

In the waveguide 130 having the top core 131 and the bottom core 132 with different cross-sectional shapes, the magnitudes of the equivalent refractive indexes of the TM0 mode and the TE1 mode are switched around the middle (Z=0.5) of the optical axis direction. In this region, the propagating mode becomes TM0-TE1 hybrid mode in which almost no individual TM0 mode or TE1 mode exists, and higher-order Polarization transformation is performed adiabatically making use of the coupling of TM0 mode and TE1 mode.

Returning to FIG. 13, the TM0 mode light incident on the waveguide 130 at Z=1 is output as TE1 mode light at Z=0. This TE1 generator 121B is also appropriately used as the TE1 generator 121 of the phase inverting coupler 111B.

<Modification of Optical Circuit Device>

Figure 15:
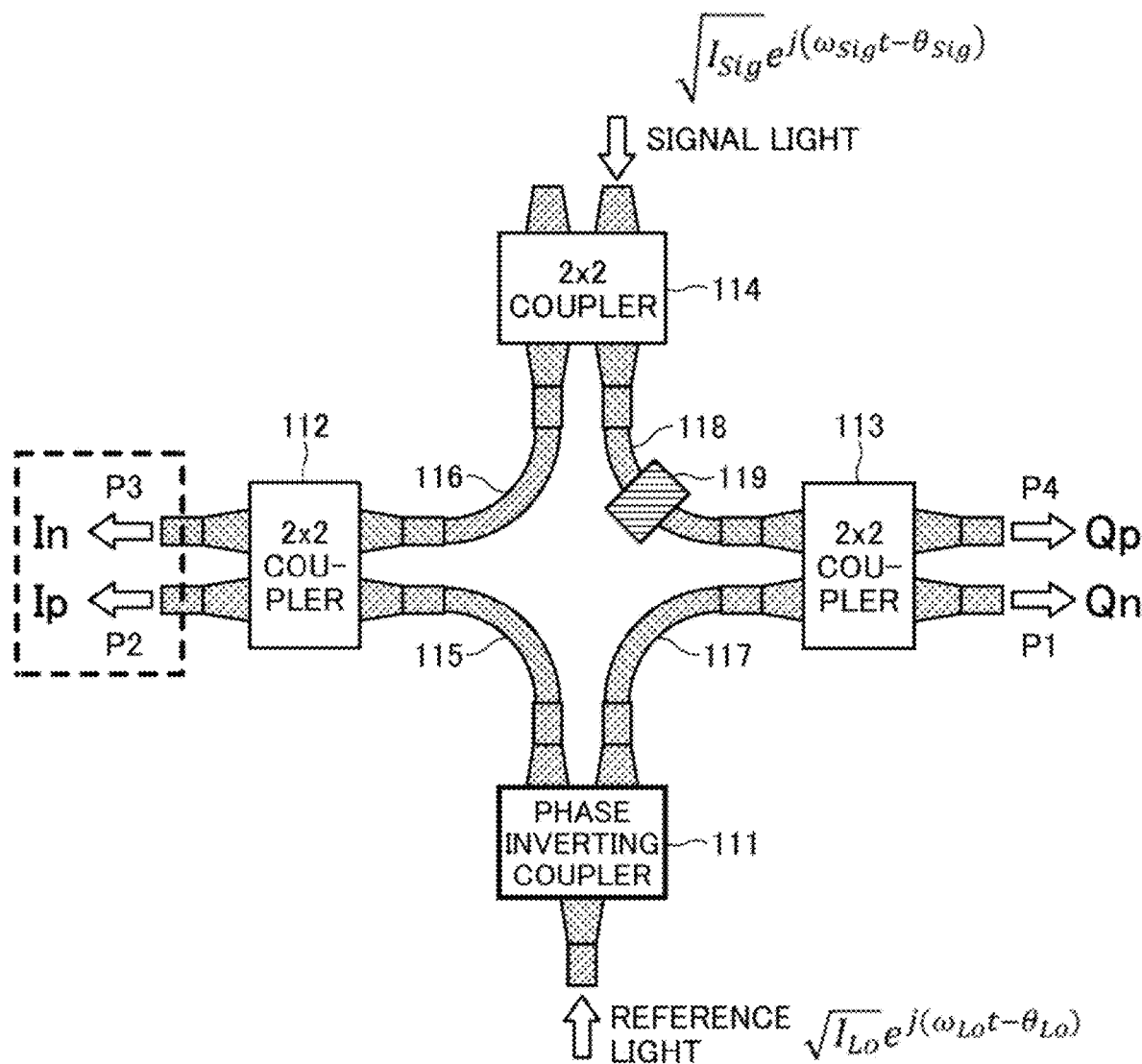
FIG. 15 illustrates a modification of the optical circuit device.

FIG. 15 illustrates an optical circuit device 11A as a modification of the optical circuit device 11. The basic configuration of the optical circuit device 11A is the same as that of the optical circuit device 11 of FIG. 5, but a phase shifter 119 is provided in at least one optical waveguide connecting two adjacent optical couplers. The phase shifter 119 is, for example, a voltage-driven phase shifter. By controlling the applied voltage, the refractive index of the waveguide is changed to control the propagation speed of light, namely, the optical phase.

Although in the example of FIG. 15, the phase shifter 119 is provided on the optical waveguide 118 connecting the 2×2 coupler 113 and the 2×2 coupler 114, one or more phase shifter(s) may be provided on at least one of the optical waveguides 115 to 118.

By providing the phase shifter 119, even when the optical path length of the optical waveguide deviates from the designed value due to manufacturing error or the like, the change in the optical path length is compensated for and the phase difference between the I signal and the Q signal is maintained at or near 90 degrees.

<Application to Optical Receiver>

Figure 16:
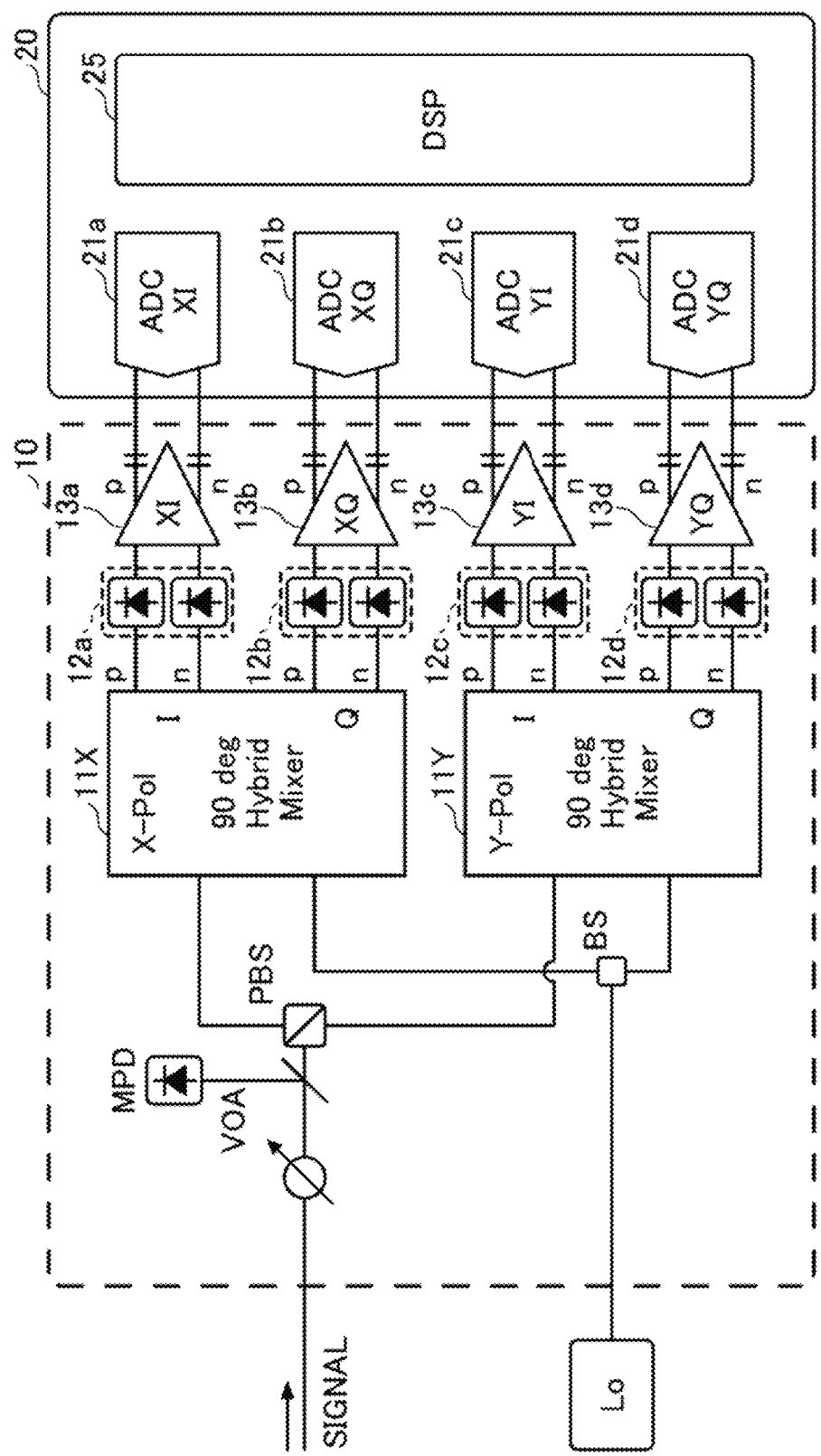
FIG. 16 is a schematic diagram of an optical receiver using an optical circuit device, according to an embodiment.

FIG. 16 illustrates an optical receiver 1 using an optical circuit device 11 of the embodiment. The optical receiver 1 has an optical receiver front-end circuit 10 and a signal processing circuit 20. The optical circuit device 11 of the embodiment is applied to 90-degree optical hybrids 11X and 11Y (which may be collectively referred to as "90-degree optical hybrid 11") in the optical receiver front-end circuit 10.

The optical receiver 1 employs a modulation scheme of, for example, dual-polarization quadrature Phase shift keying (DP-QPSK). The signal light labelled as "SIGNAL" is received from an optical transmission line, and split into two polarized waves orthogonal to each other by a polarization beam splitter (PBS). The two polarized waves are then guided to the 90-degree optical hybrid 11X for X polarization and the 90-degree optical hybrid 11Y for Y polarization, respectively.

The reference light emitted from a local oscillator (labelled as "Lo" in the figure) is split into two by a beam splitter (BS), each guided to a corresponding one of the 90-degree optical hybrid 11X for X polarization and the 90-degree optical hybrid 11Y for Y polarization.

The above-described phase inverting coupler 111 is used in each of the 90-degree optical hybrids 11X and 11Y. The split reference light incident on the corresponding 90-degreen optical hybrid is further split by the phase inverting coupler 111 into two light waves with a 180-degree phase difference between them. Meanwhile, each of the polarized waves of the signal light is also split by the 2×2 coupler 114 into two light waves with a 90-degree phase difference between them.

The four split light waves are mixed by the 2×2 couplers 112 and 113, and four optical signals Ip, In, Qp, and Qn whose phases are shifted by 90 degrees from one another are output.

The Ip signal and In signal with a 180-degree phase difference are detected by a photodetector set 12a. The photocurrents output from the photodetector set 12a are converted into voltage signals by the amplifier circuit 13a which may include a transimpedance amplifier, and the voltage signal is supplied to the signal processing circuit 20.

The Qp signal and Qn signal with a 180-degree phase difference are detected by a photodetector set 12b. The photo currents output from the photodetector set 12b are converted into voltage signals by the amplifier circuit 13b which may include a transimpedance amplifier, and the voltage signal is supplied to the signal processing circuit 20. The photodetector sets 12a to 12d and the amplifier circuits 13a to 13d serve as an O/E converter.

By using the phase inverting coupler 111, the layout of the four output ports of the 90-degree optical hybrid 11 and the layout of the input ports of O/E converter (including the photodetector sets 12a and 12b, and the amplifier circuits 13a and 13b) match each other. The length of the optical wirings is minimized.

The same applies to the 90-degree optical hybrid 11Y for Y polarized waves. The layout of the four output ports of the 90-degree optical hybrid 11Y matches the layout of the input ports of the O/E converter (including photodetector sets 12c and 12d, and amplifier circuits 13c and 13d), and the length of the optical wirings is minimized.

The analog electrical signals output from the amplifier circuits 13a to 13d are digitally sampled by analog-to-digital converters (ADCs) 21a to 21d of the signal processing circuit 20, and are restored, after waveform distortion is compensated for, by the DSP 25.

Although the present disclosure has been described based upon specific configuration examples, the disclosure is not limited to the above-described examples. The waveguides and couplers of the optical circuit device 11 may be fabricated using a silicon-on-insulator (SOI) substrate, by forming a Si core using the Si layer and forming a clad using $SiO_2$ of the buried oxide (BOX) layer of the SOI substrate. Because this combination of materials has a great difference in refractive index between the core and the clad, light confinement in the core is strong, and optical loss can be suppressed even with a small radius of curvature of the waveguides.

The configuration of the present disclosure is applicable to a planar lightwave circuit (PLC) formed by etching silica glass provided on a silicon substrate, and to an optical circuit using a compound semiconductor material such as InP or GaAs.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of superiority or inferiority of the invention. Although the embodiments of the present invention have been described in detail, it should be understood that the various changes, substitutions, and alterations could be made hereto without departing from the spirit and scope of the invention.

What is claimed is:

1. An optical circuit device comprising:
a first optical coupler configured to split a first input light into a first output beam and a second output beam with a 90-degree phase difference therebetween;
a second optical coupler configured to split a second input light into a third output beam and a fourth output beam with a 180-degree phase difference therebetween;
a third optical coupler configured to combine one of the first and second output beams of the first optical coupler and one of the third and fourth output beams of the second optical coupler, and output a first optical signal and a second optical signal having a 180-degree phase shift from each other; and
a fourth optical coupler configured to combine the other of the first and second output beams of the first optical coupler and the other of the third and fourth output beams of the second optical coupler, and output a third optical signal and a fourth optical signal having a 180-degree phase shift from each other.

2. The optical circuit device as claimed in claim 1, wherein a positional relationship between a first output port configured to output the first optical signal and a second output port configured to outputs the second optical signal from the third optical coupler, and a positional relationship between a third output port configured to output the third optical signal and a fourth output port configured to output the fourth optical signal from the fourth optical coupler are inverted to each other.

3. The optical circuit device as claimed in claim 1, comprising:
a first optical waveguide configured to connect said one of the first and second output beams of the first optical coupler to a first input port of the third optical coupler;
a second optical waveguide configured to connect the other of the first and second output beams of the first optical coupler to a third input port of the fourth optical coupler;
a third optical waveguide configured to connect said one of the third and fourth output beams of the second optical coupler to a second input port of the third optical coupler; and
a fourth optical waveguide configured to connect the other of the third and fourth output beams of the second optical coupler to a fourth input port of the fourth optical coupler,
wherein the first optical waveguide, the second optical waveguide, the third optical waveguide, and the fourth optical waveguide do not intersect.

4. The optical circuit device as claimed in claim 3, comprising:
a phase shifter provided in at least one of the first optical waveguide, the second optical waveguide, the third optical waveguide, and the fourth optical waveguide.

5. The optical circuit device as claimed in claim 1,
wherein the second optical coupler has a first waveguide segment, a second waveguide segment adjacent to the first waveguide segment at a predetermined distance from the first waveguide segment, a third waveguide segment extending continuously from the first waveguide segment, and a fourth waveguide segment extending continuously from the second waveguide segment,
wherein the second waveguide segment is tapered, a width of the second waveguide changing in an optical axis direction, and
wherein the third waveguide segment and the fourth waveguide segment extend in different directions to separate from each other.

6. The optical circuit device as claimed in claim 1,
wherein the second optical coupler has a TE1 generator configured to generate a TE1 mode light, and a one-input two-output optical coupler configured to split the TE1 mode light at an even splitting ratio into two TE0 mode light beams with a 180-degree phase shift from each other.

7. The optical circuit device as claimed in claim 6,
wherein the TE1 generator has a first mode converter configured to convert a TE0 mode incident light to a TE odd mode, and a second mode converter configured to convert the TE odd mode to a TE1 mode.

8. The optical circuit device as claimed in claim 6,
wherein the TE1 generator is configured to convert a TM0 mode incident light to a TE1 mode by higher-order polarization transformation.

9. The optical circuit device as claimed in claim 8,
wherein the TE1 generator is formed of a waveguide having a top core and a bottom core, the top core and the bottom core having different shapes in a width direction of the TE1 generator.

10. An optical receiver comprising:
the optical circuit device as claimed in claim 1;
an optical to electrical converter configured to convert the first optical signal, the second optical signal, the third optical signal and the fourth optical signal into electrical signals; and
a signal processing circuit configured to process the electrical signals.

* * * * *